Dec. 22, 1953  B. J. KRINGS  2,663,837
TRACTION-MOTOR CONTROL
Filed April 7, 1951

WITNESSES:

INVENTOR
Bernard J. Krings.
BY
ATTORNEY

Patented Dec. 22, 1953

2,663,837

UNITED STATES PATENT OFFICE 2,663,837

TRACTION-MOTOR CONTROL

Bernard J. Krings, Pittsburgh, Pa., assignor to Westinghouse Electric Corporation, East Pittsburgh, Pa., a corporation of Pennsylvania Application April 7, 1951, Serial No. 219,847

13 Claims. (Cl. 318—274)

My invention relates to traction-motor control-systems and apparatus, and it has particular relation to trolley-coach or bus equipment using a direct-current motor having both a series main-field winding and a shunt main-field winding, on the same magnetic poles, the series winding being exclusively excited for motoring, and the shunt winding being exclusively excited for dynamic braking.

My present invention provides a novel means for guarding against a reapplication of power to the traction motor, after power-interruption during a high-speed motor-connection, and particularly during a reduced-field motor-operating condition, using, for this purpose, a relay having two energizing-coils. One of these energizing-coils is responsive to the current in an auxiliary motor which is energized across the line and which has to be interlocked with the main or traction motor so that the traction motor cannot be energized when the auxiliary motor is not energized. The other energizing-coil of this relay is energized across the series main-field winding of the traction motor, or otherwise energized so as to be responsive to a sudden rate of decrease of the current in the main motor, so as to kick out the relay, thus interposing a block against the re-energization of the main motor, or any equivalent means to this end.

Heretofore, it has been found that a failure of the trolley-voltage would not always result in a deenergization of a previously used relay which was energized solely in response to the current in the auxiliary motor, because the regenerative operation of the main motor would continue the operation of the auxiliary motor, enduring a power-off condition of the line-voltage. My present system makes it impossible to reapply power to the main motor, with the main motor in a high-speed controller-position, after a voltage-interruption of more than $\frac{1}{40}$ of a second, or whatever time is required for the dropping out of my double-coil relay, so that interlocks may be provided for thereafter preventing the reapplication of power to the main motor until the controller had been moved back to a predetermined low-speed position.

Figure 1:
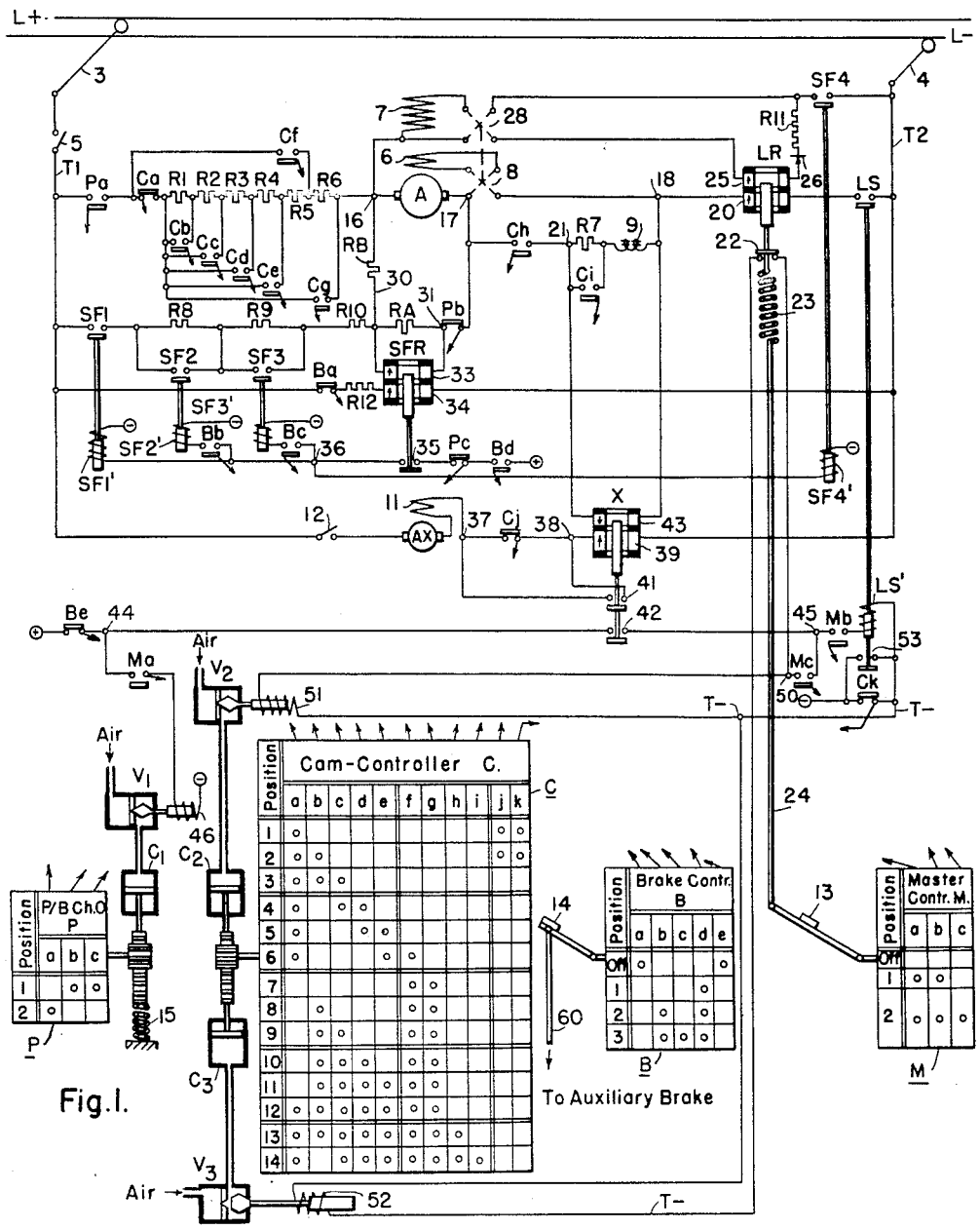
Figure 2:
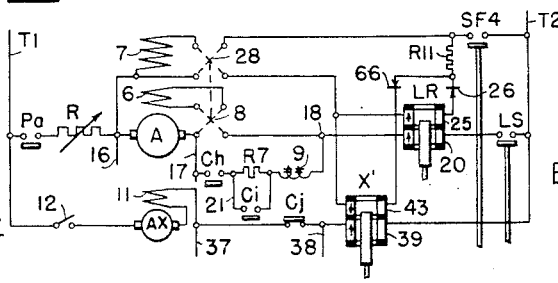

With the foregoing and other objects in view, my invention consists in the apparatus, circuits, systems, combinations, parts, and methods of design and operation, hereinafter described and claimed, and illustrated in the accompanying drawing, wherein:

Figure 1 is a diagrammatic view of circuits and apparatus embodying my invention in a preferred illustrative form of embodiment, and Fig. 2 is a similar view of a part of the apparatus, illustrating an alternative form of embodiment.

The equipment shown in Fig. 1 represents the electrical parts of a trolley-coach, which is energized from positive and negative trolley-wires L+ and L— through two trolley-poles 3 and 4, or other current-collecting devices. The two trolley-poles 3 and 4 energize a pair of supply-line terminals T1 and T2, respectively, preferably through a switching-means 5 which is interposed between at least one of the terminals T1 and its associated trolley-pole 3.

The trolley-coach is provided with a main direct-current traction-motor having an armature A, a series main-field winding 6 and a shunt main-field winding 7, these two main-field windings being wound on the same poles. The series main-field winding 6 is connected in series with the armature A through a reverser 8.

The acceleration of the main motor A is accomplished by operating the motor as a straight or ordinary series motor which is brought up to speed by cutting out series resistances R1 to R6, in a conventional manner. When all of the series resistance R1 to R6 has been cut out, the motor-speed may be still further increased by one or more field-shunting steps whereby the series field 6 is shunted by a field-shunt consisting of a resistance R7 and a choke-coil 9, which may be connected, in whole or in part, in shunt across the series main-field winding 6.

Dynamic braking is accomplished by a disconnection of the main motor from the line, and the separate energization of the shunt-field winding 7, either across the line or across any other suitable direct-current source other than the armature-terminals of the main motor. During this dynamic-braking operation, a suitable dynamic-braking load, shown as consisting of resistances RA and RB, is connected across the terminals of the motor-armature A.

In accordance with a known dynamic-braking system, the net exciting-voltage which is impressed upon the shunt-field winding 7 is automatically reduced by the amount of voltage-drop which is produced by the armature-current in the RB resistor, so as to automatically increase the motor-excitation when the braking-current decreases, thus producing the effect of a notchless type of dynamic braking, which produces an approximately constant tractive effort. In practice, the dynamic braking starts out at a high motor-speed, with a high armature-current and a low shunt-field excitation, and, as the motor-speed decreases, the armature-current also decreases and the shunt-field current automatically increases, so as to tend to increase the amount of dynamic braking which is produced by the motor. The amount of dynamic-braking tractive-effort which is maintained may be preselected by the cutting out of more or less of a field-resistance R8 to R10 which is connected in series with the shunt main-field winding 7 during dynamic braking.

In accordance with a known practice, my trolley-coach equipment also includes an auxiliary direct-current motor, having an armature AX, and a series field-winding 11. This auxiliary motor is adapted to be connected across the line-terminals T1 and T2 by any suitable switching-means 12. The auxiliary motor AX is, or may be, used for any one of a number of purposes which are more or less important to the successful operation of the main motor A, such as driving a blower (not shown) for cooling the resistors or even cooling the main motor itself, or driving an auxiliary generator (not shown) for battery-charging or for other auxiliary uses on the trolley-coach.

The controller-equipment for controlling the operation of the main traction-motor A includes four controllers which are shown at the bottom of Fig. 1. Reading backwardly, from right to left, these controllers include, first, a master controller M which is operated by a pedal 13; second, a brake-controller B which is operated by a pedal 14; third, a cam-controller C which is illustrated as being operated by an air-engine consisting of two opposed cylinders $C_2$ and $C_3$; and finally a two-position power-brake changeover (P/B Ch.O.) switch P, which is illustrated as being actuated by an air-engine having a single cylinder $C_1$, which moves the changeover switch against the bias of a spring 15 which is adapted to return the switch to its normal unactuated position.

Each of these four controllers M, B, C, and P is provided with a plurality of operating-positions and a plurality of contacts, the latter being designated by letter-suffixes, and the contact-sequence being diagrammatically indicated, in each case, in the form of a sequence-chart wherein a closed position of any particular contact is indicated by a circle, in accordance with the usual convention. For convenience in finding the various contacts of the several controllers, and as a convention for diagrammatically indicating the mechanical connection or association between the various contacts and the various controllers, I have used arrows, which have been chosen in lieu of dotted-line connections, as a convention for indicating the association without confusing the diagram with large numbers of dotted lines running between the various parts.

The illustrated control-circuits, for controlling the main traction-motor A during motoring and braking, may be traced as follows. Starting with the line-terminal T1, the main motor-circuit includes, first, a contactor Pa of the power-brake changeover-switch P, followed by the accelerating resistors R1 to R6 which are under the control of the cam-controller contacts Ca to Cg. Next comes the positive terminal 16 of the motor-armature A, followed by the armature and the negative armature-terminal 17, the reverser 8, a conductor 18, the main or series coil 20 of a limit-relay LR, and finally a line-switch contact LS, which is connected to the negative line-terminal T2. The field-shunt R7 and 9 is adapted to be connected across the series main-field winding 6 by means of a controller-contact Ch which is connected between the negative motor-terminal 17 and a conductor 21. Next comes the shunt-resistor R7, which is shunted by a controller-contact Ci, followed by the choke-coil 9 which is connected to the conductor 18.

The limit-relay LR is provided with a back-contact 22, which is closed when the relay is deenergized or not sufficiently energized. This relay is biased toward its non-responsive or non-energized position by means of a spring 23, which is stretched by a depression of the master-controller pedal 13, as diagrammatically indicated by a mechanical connection 24, in accordance with a known motor-coach control-system. As described and claimed in a companion-application of Norman H. Willby, Serial No. 218,320, filed March 30, 1951, I provide the limit-relay LR with a second operating-coil 25, or other operating-means which makes the limit-relay responsive to the sudden rates of increase of the current in the main motor A, during successive notches or positions of the accelerating-controller C. As a convenient means for making the limit-relay LR responsive to the rate of increase of the current in the main motor, I have illustrated the auxiliary relay-winding 25, in Fig. 1, as being energized across the terminals of the shunt main-field winding 7, through a suitable resistance R11 which is connected in series with the auxiliary relay-coil 25.

In many trolley-coach installations, the main traction-motor is not operated backwardly except at very slow speeds, and for brief times, so that the operation of the limit-relay LR is not important during such conditions. However, in case the limit-relay operation is important during reversed motor-connections, the improper response of the auxiliary limit-relay coil 25 may be avoided, either by the use of a serially connected rectifier 26, in series with said auxiliary coil 25, or by means of additional reverser-contacts 28, or both of these expedients may be used, or both omitted if they are not required.

The purpose of the auxiliary coil 25 of the limit-relay LR is to give said relay a cumulative or added operating-impulse, in addition to the action of the main relay-coil 20, whenever there is a sudden increase in the motor-current. A sudden increase in the motor-current produces a sudden increase in the main-field flux, due to the series main-field winding 6, and this induces a voltage in the shunt main-field winding 7, which gives the desired impulse to the auxiliary coil 25 of the limit-relay LR.

For dynamic-braking operation, the motor-armature A is shunted by means of a braking-resistor load-circuit, which may be traced from the positive motor-terminal 16, through the braking-resistor RB to a conductor 30, thence through the braking-resistor RA to a conductor 31, and finally through a changeover-switch contact Pb to the negative motor-terminal 17.

The energization of the shunt main-field winding 7 during dynamic braking is accomplished by a circuit which may be traced from the positive line-terminal T1, through the make-contact of a shunt-field contactor SF1, and thence through the field-resistors R8 and R9, which are respectively shunted by two shunt-field contactors SF2 and SF3, and then through the field-resistance R10 which is connected to the conductor 30. Next comes the braking-resistor RB, which is traversed by the motor-current during dynamic braking, and which is connected to the positive motor-terminal 16. The shunt main-field winding 7 is connected between this positive motor-terminal 16 and the negative line-terminal T2 through the make-contact of a fourth shunt-field contactor SF4.

As described and claimed in the previously mentioned Willby application, the braking-resistor RA (or any other portion of the braking-resistor load-circuit) is shunted by means of an auxiliary or "holding" coil 33 of a special shunt-field relay SFR. This relay is also provided with a main or "close" coil 34 which is connected across the line-terminals T1 and T2 through a brake-controller contact Ba and a resistor R12. The shunt-field relay SFR is provided with a make-contact 35 which is in series with the energizing-circuits for the operating-coils of the four shunt-field contactors SF1 to SF4.

The control-circuits for these four shunt-field contactors SF1 to SF4 may be traced as follows. Starting from the positive terminal (+) of any suitable direct-current source, which may be a battery (not otherwise shown) carried by the trolley-coach, this shunt-field contactor-energizing circuit extends first through a brake controller contact Bd, then a changeover-switch contact Pc, then the SFR contact 35, and thence to a conductor 36. The conductor 36 is directly connected to the operating-coils SF1' and SF4' of the shunt-field contactors SF1 and SF4 respectively. The conductor 36 is also connected, through a brake-controller contact Bb, to the operating coil SF2' of the shunt-field contactor SF2. In like manner, the conductor 36 is connected, through a brake-controller contact Bc, to the operating coil SF3' of the shunt-field contactor SF3.

The circuit for the auxiliary motor AX can be traced from the positive line-conductor T1, through the switching member 12, the armature AX, the series field 11, and thence to a conductor 37. The circuit then continues, from the conductor 37, through a cam-controller contact Cj, to a conductor 38, and thence through the main coil 39 of an auxiliary relay or contactor X, and finally to the negative line-terminal T2. The contactor X has two make-contacts 41 and 42.

In accordance with my invention, I equip the contactor X with an auxiliary bucking or differential coil 43 which is energized so as to be responsive to the rate of decrease of the current in the main motor A during motoring operation. In Fig. 1, this rate-of-decrease response is obtained by connecting the auxiliary coil 43 of the contactor X across the series main-field winding 6, to take advantage of the fact that said series main-field winding develops, across its terminals, a voltage which is responsive to the rate of change of the motor-current, during motoring, because of the reactance of this series main-field winding. Since the main need for the auxiliary bucking-coil 43 on the contactor X is during weakened-field operation, I have shown, in Fig. 1, an energizing connection whereby the aforesaid bucking-coil 43 is connected across the conductors 21 and 18, so as to be energized only when the controller-contact Ch is closed. It will be understood, of course, that any equivalent bucking-coil energization might be used, whereby the contactor X is given a kick-out impulse, or a demagnetizing impulse, in response to a sudden decrease in the current flowing through the main motor A during the motoring operation, as would be obtained when there is an interruption in the power which is supplied to the line-terminals T1 and T2 of the trolley-coach.

In accordance with my invention, the first contactor-contact 41 of the auxiliary contactor X is connected across the conductors 37 and 38, so as to be in parallel with the controller-contact Cj, which is also an innovation which has been introduced in accordance with my invention. The second contactor-contact 42 is used, in a somewhat conventional fashion, to condition a control-circuit 44—45 for motoring-operation when the auxiliary motor AX is properly energized for running. Since motoring operation should be permitted only in the off-position of the brake-controller B, the motor-operation control circuit 44 energized, say from the positive battery-terminal (+), through the brake-controller contact Be. When the motor-operation control-circuit 44 is thus energized, a branch-circuit through the master-controller contact Ma, energizes the valve magnet-coil 46 of a "standard" valve V1, which admits compressed air to the cylinder C1 which actuates the power-brake changeover-switch P so as to move it from its braking positon No. 1, to its motoring position No. 2, thereby opening the braking-operation changeover-contacts Pb and Pc, and closing the motoring-operation changeover-contact Pa which is the motor-energizing circuit of the main motor A.

This master-controller contact Ma, which controls the changeover-switch P, is closed in response to the first movement of the master-controller pedal 13. At the same time, the master controller M closes a second contact Mb, which is connected between the circuit 45 and the operating coil LS' of the line-switch LS, thus completing the energization-circuit for the main motor A, with all of the starting-resistance R1 to R6 in series with the motor-armature. This happens in the No. 1 position of the master controller M, which closely follows an off-position in which the master-controller contacts are open.

When the master-controller pedal 13 is still further depressed, it puts the master-controller in its last position, which is marked position No. 2. This is a general term for any portion of all of the rest of the movement of the master controller, after passing the brief No. 1 position. In the No. 2 position, the master controller M keeps its contacts Ma and Mb closed, and closes its third contact Mc, which is connected between the conductor 45 and a conductor 50. This conductor 50 energizes a valve magnet-coil 51 of a "standard" valve V2, which admits compressed air to the cylinder C2, the function of which is to drive the cam-controller C in the advancing or forward direction. The cam-controller C cannot move forward, however, as long as the return-movement cylinder C3 is energized, which is normally the case because it is associated with an "inverted" magnet-valve V3 which, in its normal or deenergized position, admits compressed air to the return-movement cylinder C3.

The "inverted" valve V3 is provided with a magnet-coil 52, which is energized, in series with the limit-relay back-contact 22, from the previously mentioned conductor 50. Since the limit-relay LR is initially deenergized, the first advance of the master-controller M into position No. 2 results in the energization of the inverted-valve magnet-coil 52, simultaneously with the energization of the standard-valve magnet-coil 51, so that the cam-controller C immediately begins to be pushed forward by its air-engine. The cam-controller C then acts as a multi-step accelerator-means, for making progressive changes in the electrical energization of the main traction-motor A, for increasing its speed. At the same time, the cam-controller C acts as a sequence-determining means for controlling the sequence of these motor-accelerating steps.

The cam-controller C, if its air-engine magnet-coils 51 and 52 were left continuously energized, would complete its advance-movement in 2½ seconds, or whatever other time the apparatus is set for. However, it will be noted that the advance-movement of the air-engine which controls the cam-contactor C is under the control of the back-contact 22 of the limit-relay LR, so that, as soon as the acceleration-control of the main traction-motor A has progressed far enough to make the motor-current overcome the setting of the limit-relay LR, the limit-relay back-contact 22 opens, thereby deenergizing the inverted valve V₃ and admitting compressed air to the return-movement cylinder C₃, thereby locking the two cylinders C₂ and C₃ against each other, so that the cam-controller is held still at this time. The next advance-step of the acceleration-sequence is not taken until the motor has remained on the step at which the limit-relay LR picked up, long enough for its motor-current to subside below the dropout-setting of the limit-relay LR, due to the gradual further acceleration of the motor while it is on this position or notch.

The setting of the limit-relay LR is under the control of the operator, because it is dependent upon the amount by which the master-controller pedal 13 is depressed. In this manner, the operator has control over the rate at which the trolley-coach is accelerated, or the maximum permissible motor-current which is permitted to flow in the main traction-motor A.

The return-circuits for the line-switch coil LS', and for the two valve magnet-coils 51 and 52 of the cam-controller C, is through a conductor T—, which is connected to the negative battery-terminal (—) through a cam-controller contact Ck, which is shunted by an auxiliary make-contact 53 on the line-switch LS. The four shunt-field contactor-coils SF1 to SF4, and the valve magnet-coil 46 of the power-brake changeover-switch P, all have their return-circuits directly connected to the negative battery-terminal (—).

The operation of the trolley-coach control-system which is shown in Fig. 1 will be more or less apparent from the sequence-charts which constitute the diagrammatic representation of the four controllers M, B, C, and P, and from the preceding descriptions. The operation may be summarized, however, as follows, with special emphasis on the novel features of the invention.

Whenever the master controller M is in its off-position, the power-brake changeover-switch P is in its deenergized or No. 1 position, in which the main motor A is disconnected from the line-terminal T1 by the open changeover-contact Pa, and in which the two brake-position changeover-contacts Pb and Pc are both closed. The changeover-contact Pb connects the two braking resistors RA and RB across the armature-circuit 16—17 of the main motor, while the changeover-contact Pc partially prepares the energizing-circuit for the four shunt-field contactor coils SF1' to SF4'.

If, now, the master-controller pedal 13 is depressed, the master controller M, through its contacts Ma and Mb, will first energize the changeover-switch P and the line-switch LS, thus energizing the main motor A across the line-terminals T1 and T2, through the closure of the contacts Pa and LS. When the master-controller M is advanced into its position No. 2, the acceleration of the main motor then proceeds in the usual manner, except for the special limit-relay energization which is described and claimed in the aforesaid Willby application. The second limit-relay coil 25 has the effect of increasing the limit-relay excitation in response to the sudden rate of increase of the motor-current, at each moment when an advance-step or notch is taken in the acceleration-control of the main motor. This additional excitation-impulse lasts but a moment, but it has the advantage of making the limit-relay LR pick up with greater certainty and promptness, when the main motor-current is about to reach the value for which the limit-relay is set. This improved limit-relay is thus very effective in preventing the skipping of notches, or advance-steps in the acceleration of the main motor, which was one of the major troubles of the described type of acceleration-controller when it was heretofore used with a conventional limit-relay having only a series operating-coil in series with the current of the main motor A.

The relative strengths of the limit-relay series-coil 20 and the limit-relay auxiliary coil 25 may be adjusted over considerable limits. By making the auxiliary coil 25 relatively weak, its transient impulses due to successive advance-notchings of the multi-step accelerator-control will be sufficiently weak to have no effect upon the operation of the limit-relay LR until the motor-current approaches fairly close to its limiting value, which is set by the amount of depression of the master-controller pedal 13, and hence the amount of pull of the spring 23 which controls the setting of the limit-relay LR.

In this way, the forward movement of the cam-controller or accelerator C may be left undisturbed until a sufficient number of accelerating-notches or positions have been passed, to cause the current in the main motor A to reach, say, 80% of its desired maximum value, according to the rate of acceleration which is fixed by the position of the operator's master-controller pedal 13. After this current-value has been reached in the main motor, the series coil 20 of the limit-relay will have nearly enough energization to pick up the limit-relay, so that, on each succeeding notch, the additional energization which is provided by the shunt coil 25 of the limit-relay, in response to each current-increase when a new notch is reached, will cause the limit-relay LR to pick up, one notch at a time, thus stopping the progression or advancement of the cam-controller or accelerator C each time a new notch or position is reached, thus permitting the subsequent dropout-action of the limit-relay LR to control the times at which additional one-step advances are to be made in the progress of the movement of the cam-controller C.

When the master-controller M is returned to its off-position, its contacts Ma, Mb, and Mc are all opened, thus opening the power-brake changeover-contact Pa, opening the line-switch contact LS, and at the same time deenergizing both of the magnet-coils 51 and 52 of the cam-controller C, so that the "inverted" valve V3 admits compressed air to the return-movement cylinder C3, while the "standard" valve V2 vents the advance-movement cylinder C2, thus causing the air-engine to return the cam-controller C to its No. 1 position. At the same time that the power-brake changeover-contact Pa is opened, the changeover-contact Pb is closed, connecting the braking-resistors RA and RB across the armature-terminals 16 and 17, and the changeover-contact Pc is closed, in the control-circuit for the shunt-field contactors SF1 to SF4; but the shunt main-field winding 7 is deenergized at this time, so that there is substantially no dynamic braking.

As soon as the line-switch LS is dropped out, its auxiliary make-contact 53 opens, thus disconnecting the control-circuit conductor T— from the negative source-terminal (—). This makes it impossible for the operator, by immediately again moving his master-controller M to the full-on position, to again energize either the line-switch LS or the magnet-coils 51 and 52 of the air-engine of the cam controller C, until the return-movement of the air-engine has returned the cam-controller C to a position which is sufficiently close to its starting or low-speed position, so that it will be safe to re-energize the main motor A without discomfort to the coach-passengers and without undesirable mechanical strains on the equipment. During as many of the first positions of the cam-controller C as may thus be desirable (the first two positions being indicated on the sequence-chart of this controller), the controller-contact Ck is closed, being open in all subsequent positions of the cam-controller C. When the return-movement of the cam-controller C has reached such a low-speed position that the aforesaid contact Ck is closed, then the open make-contact 53 of the line-switch LS is by-passed, and it then becomes possible for the operator to set up a new motor-operation of the main motor A, as is well known in the art.

The special shunt-field relay SFR which is described and claimed in the Willby application is normally energized, through its "close" winding 34, whenever the brake-controller B is in its off-position, at which time the brake-controller contact Ba connects said "close" coil 34 across the line-terminals T1—T2, or across whatever other direct-current source is used for exciting the shunt main-field winding 7 during the dynamic-braking operation of the main motor A. When this special shunt-field relay SFR is energized, it closes its make-contact 35 which partially energizes the control-circuit 36 for the shunt-field contactors SF1 to SF4, by which I mean that it puts said control-circuit in readiness for being energized as soon as the brake-controller contact Bd closes.

If, now, the brake-controller pedal 14 is depressed while the main motor A is coasting, disconnected from the line at Pa and LS, the first on-position of the brake-controller B will close the controller-contact Bd, thus energizing the control-circuit 36 since the contacts Pc and 35 are already closed, as above described. The control-circuit conductor 36 will energize the first and last shunt-field contactors SF1 and SF4, thus energizing the shunt main-field winding 7 of the main motor A. As soon as this shunt main-field winding 7 is energized, it causes the main motor to operate as a generator, building up a voltage across its armature-terminals 16 and 17, and supplying energy to the brake-resistance load RA and RB. The voltage-drop thus generated in the brake-resistance RA is applied to the "hold" coil 33 of the special shunt-field relay SFR, thus holding this relay energized, and keeping its contact 35 closed, notwithstanding the fact that its "close" coil 34 is deenergized by reason of the opening of the brake-controller contact Ba at substantially the same time when the brake controller contact Bd is closed.

As previously stated, the voltage-drop due to the flow of the dynamic-braking armature-current through the braking-resistor RB is in opposition to the line-voltage which is applied to the shunt main-field winding 7, so that the strength of the shunt-field excitation of the main motor A is automatically increased, as the armature-current decreases as a result of the decreasing of the motor-speed, thus tending to hold the braking-traction more nearly constant. The amount of this brake-traction can be pre-selected by the amount of depression of the brake-pedal 14, by moving the brake-controller B to either one of its three on-positions, thus selecting the amount of field-resistance R8 to R10 which is left in the circuit of the shunt main-field winding 7, thus controlling the excitation of the main motor during dynamic braking.

When the dynamic-braking current which is supplied by the motor-armature A drops to such a low value that dynamic braking is no longer practical, the reduced voltage-drop across the braking-resistor RA so far deenergizes the "hold" coil 33 of the special shunt-field relay SFR, that this relay drops out, and opens its make-contact 35, thus deenergizing all of the shunt-field contactors SF1 to SF4, deenergizing the shunt main-field winding 7, thereby preventing the overheating of the shunt field-winding and unnecessary power-loss. It will be understood that the brake-pedal 14 is also used to control an auxiliary brake, as diagrammatically indicated by the connection 60, so as to be able to bring the coach to full standstill, and to hold the coach at standstill. This auxiliary brake may take any one of a number of forms, and may have any one of a number of different control-systems (not shown), as is well understood in the art.

My special auxiliary relay or contactor X is for the purpose of opening its contact 42, so as to prevent a motoring operation, and also to prevent any advancement of the cam-controller C from its No. 1 position, in response to a power-off condition, and more particularly in response to a power-off condition which occurs while the main motor A is operating as a motor. This contactor X is provided with the usual main exciting winding or coil 39 which is energized by the current flowing through an auxiliary motor AX which performs such an important function (whatever that function may be) that its operation must be assured, before the commencement of a motoring-operation of the main motor A can be permitted.

It is extremely desirable, however, that means should be provided for opening or "killing" the motor-operation control-circuits if a power-interruption should occur during the motoring operation of the main motor A, and it is also desirable that this operation should be accomplished by the same relay or contactor X which is used to make sure that the auxiliary motor is operatting before the main motor is energized in the first place, thus avoiding the necessity for providing a separate power-off-responsive relay or contactor. Heretofore, this power-off response-function has usually been poorly or belatedly performed by the contactor X, when said contactor has been provided with only the one main energizing-coil 39, because, when a power-off condition arises while the main motor A is motoring, the inertia of the main motor will cause it to operate as a series generator, supplying power, for a while, to the auxiliary motor AX, and thus preventing the auxiliary relay or contactor X from dropping out until the coach-speed has dropped to a rather low value.

By reason of the equipment of the special auxiliary relay or contactor X, with an auxiliary winding 43, which is so connected as to produce a deenergizing effect in response to a sudden decrease in the current flowing through the main motor A, at the time of a power-interruption, it is now possible to so far neutralize the magnetization produced by the main coil 39 of this auxiliary relay X, as to cause said relay to drop out in response to every power-outage condition, notwithstanding the regenerative power-feedback into the auxiliary motor from the main motor. The auxiliary contactor or relay X has a short dropout-time, which may be of the order of 1/40 of a second. If a power-outage lasts less than that small length of time, an immediate re-application of power to the main motor will generally not produce any objectionable effects. If a power-outage condition lasts longer than that, the improved auxiliary relay X will drop out, or be kicked out, thus opening not only the motor-operation control-circuits (at 42) but also opening the energizing-circuit of the main coil 39 of this relay (at the contact 41).

This contact 41 is a new feature, which deenergizes the auxiliary motor AX, and hence the auxiliary relay or contactor X, until the cam-controller C has automatically moved back (or been moved back by the operator in case a manual control is used), to a suitable low-speed position, which again may be any low-speed position, and which is again illustrated as the No. 2 position, as indicated by the sequence-chart for the cam-controller contact Cj, which is connected in the auxiliary-motor circuit in parallel with the contact 41 of the auxiliary relay or contactor X.

As previously indicated, the auxiliary coil 43 of the special auxiliary relay or contactor X may have any kind of energization which will make it responsive to the rate of decrease of the current in the main motor A. In Fig. 2, I have shown an alternative excitation-system for the auxiliary coil 43 of the auxiliary relay or contactor X', corresponding to the contactor X in Fig. 1. In Fig. 2, the energization for the auxiliary coil 43 of the contactor X' is taken from the terminals of the shunt main-field winding 7, in series with the resistance R11.

In this case, as shown in Fig. 2, since the polarity of the voltage-kicks which are induced in the shunt main-field winding 7, as a result of current-changes in the main motor A, are reversed in polarity whenever the reverser 8 is reversed, it is necessary to provide either the auxiliary reverser-contacts 28, for reversing the polarity of these voltage-kicks whenever the reverser 8 is reversed, or a rectifier 66 for making it possible for the auxiliary coil 43 to receive voltage-kicks only in the desired polarity. Of course, both of these polarity-determining means may be provided as shown, if desired, but in general only one of them will be necessary, either 28 or 66.

The rest of the operation, in Fig. 2, will be the same as has been described for Fig. 1, with the understanding that Fig. 2 has been very much simplified, by the diagrammatic indication of the accelerating-resistance control as simply a variable resistance R, and by the omission of the control-circuits relative to the shunt-excitation of the shunt main-field winding 7 during dynamic braking, and also the omission of the controllers and the controller-circuits.

While I have illustrated my invention in only two illustrative forms of embodiment, I wish it to be understood that I am not at all limited to these precise forms of embodiment, as the broader aspects of my invention embrace the range of equivalents which has been indicated in the foregoing description. I desire, accordingly, that the appended claims shall be given the broadest construction consistent with their language.

I claim as my invention:

1. A direct-current motor, speed-controller means for variably energizing the motor across a pair of supply-line terminals, a control-means for producing a predetermined control-operation in response to a sudden rate of decrease of the motor-current, interruption-responsive means, responsive to said control-operation, for interposing a block for preventing the re-energization of said motor, and means responsive to a low-speed position of said speed-controller means for removing said block.

2. A direct-current motor having a series field-winding, multi-step accelerator-means for making a predetermined sequence of progressive changes in the electrical energization of the motor for increasing the speed of the motor, a control-means for producing a predetermined control-operation in response to a sudden rate of decrease of the motor-current, interruption-responsive means, responsive to said control-operation for interposing a block for preventing the re-energization of said motor, and means responsive to a low-speed position of said accelerator-means for removing said block.

3. The invention as defined in claim 2, characterized by a high-speed position of said accelerator-means including field-weakening means, and means for rendering said interruption-responsive means ineffective except in a field-weakening position of said accelerator-means.

4. A motor-combination including a main direct-current motor and an auxiliary direct-current motor, circuit-means for energizing both of said motors across a pair of supply-line terminals, the circuit-means for energizing the main motor including a speed-controller means for variably energizing said main motor, auxiliary-relay-means, responsive to a lack of current in the auxiliary motor, for preventing the energization of the main motor, interruption-responsive means, responsive to a sudden rate of decrease of the current in the main motor, for interposing a block for preventing the energization of the main motor, and means responsive to a low-speed position of said speed-controller means for removing said block.

5. A motor-combination including a main direct-current motor and an auxiliary direct-current motor, circuit-means for energizing both of said motors across a pair of supply-line terminals, the circuit-means for energizing the main motor including a speed-controller means for variably energizing said main motor and an interlocking-relay-means having a relay-out contact-means for preventing the energization of the main motor, and excitation-means for making said interlocking-relay-means responsive to the current in the auxiliary motor and for causing said interlocking-relay-means to return to its non-responsive position in response to a sudden rate of decrease of the current in the main motor.

6. The invention as defined in claim 5, in combination with means responsive to a low-speed position of said speed-controller-means for making possible a re-energization of the main motor.

7. The invention as defined in claim 5, characterized by a high-speed position of said accelerator-means including field-weakening means, and means for rendering said rate-responsive excitation-means ineffective except in a field-weakening position of said accelerator-means.

8. The invention as defined in claim 5, characterized by a high-speed position of said accelerator-means including field-weakening means, means for rendering said rate-responsive excitation-means ineffective except in a field-weakening position of said accelerator-means, and means responsive to a low-speed position of said speed-controller-means for making possible a re-energization of the main motor.

9. The invention as defined in claim 5, characterized by means for causing the non-responsive position of said interlocking-relay-means to interpose a block for preventing the energization of said auxiliary motor, and means responsive to a low-speed position of said speed-controller means for removing said block.

10. The invention as defined in claim 9, characterized by a high-speed position of said accelerator-means including field-weakening means, and means for rendering said rate-responsive excitation-means ineffective except in a field-weakening position of said accelerator means.

11. The invention as defined in claim 9, characterized by a high-speed position of said accelerator-means including field-weakening means, means for rendering said rate-responsive excitation-means ineffective except in a field-weakening position of said accelerator-means, and means responsive to a low-speed position of said speed-controller-means for making possible a re-energization of the main motor.

12. A direct-current motor having both series and shunt main-field windings, motor-operation circuit-means for deenergizing the shunt main-field winding and for energizing the series main-field winding in series with the motor-armature across a pair of supply-line terminals during the motoring operation, multi-step accelerator means for making a predetermined sequence of progressive changes in the electrical energization of the motor for increasing the speed during motoring operation, changeover circuit-means for energizing the shunt main-field winding, and for substantially disconnecting the motor-armature from the supply-line terminals, and for connecting a braking-resistance load across the motor-armature, during dynamic braking, auxiliary-relay-means, responsive to the voltage across the shunt main-field winding during motoring operation, for interposing a block for deenergizing the motor, and means responsive to a low-speed position of said accelerator-means for removing said block.

13. The invention as defined in claim 12, characterized by a high-speed position of said accelerator-means including field-weakening means, and means for rendering said auxiliary-relay-means ineffective except in a field-weakening position of said accelerator-means.

BERNARD J. KRINGS.

References Cited in the file of this patent
UNITED STATES PATENTS

| Number | Name | Date |
|---|---|---|
| 1,844,910 | Wyman | Feb. 9, 1932 |